(12) United States Patent
Wu et al.

(10) Patent No.: US 12,014,466 B2
(45) Date of Patent: *Jun. 18, 2024

(54) TRIGGERING A COLLABORATIVE AUGMENTED REALITY ENVIRONMENT USING AN ULTRASOUND SIGNAL

(71) Applicant: GOOGLE LLC, Mountain View, CA (US)

(72) Inventors: Shengzhi Wu, Mountain View, CA (US); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,416

(22) Filed: Jan. 13, 2023

(65) Prior Publication Data

US 2023/0252739 A1 Aug. 10, 2023

Related U.S. Application Data

(63) Continuation of application No. 16/949,791, filed on Nov. 13, 2020, now Pat. No. 11,557,097.

(51) Int. Cl.
*G06T 19/00* (2011.01)
*G02B 27/01* (2006.01)
*H04L 67/131* (2022.01)

(52) U.S. Cl.
CPC .......... *G06T 19/006* (2013.01); *G02B 27/017* (2013.01); *H04L 67/131* (2022.05); *G02B 2027/0178* (2013.01)

(58) Field of Classification Search
None
See application file for complete search history.

(56) References Cited

U.S. PATENT DOCUMENTS

| 9,824,206 | B1 | 11/2017 | Liu et al. |
| 2014/0375688 | A1 | 12/2014 | Redmann et al. |
| 2017/0213473 | A1 | 7/2017 | Ribeira et al. |
| 2017/0244811 | A1 | 8/2017 | McKenzie et al. |

(Continued)

OTHER PUBLICATIONS

International Search Report and Written Opinion for PCT Application No. PCT/US2021/071437, dated Dec. 23, 2021, 10 pages.

(Continued)

*Primary Examiner* — David H Chu
(74) *Attorney, Agent, or Firm* — Brake Hughes Bellermann LLP

(57) ABSTRACT

According to an aspect, a method for sharing a collaborative augmented reality (AR) environment including obtaining, by a sensor system of a first computing system, visual data representing a physical space of an AR environment, where the visual data is used to create a three-dimensional (3D) map of the physical space. The 3D map includes a coordinate space having at least one virtual object added by a user of the first computing system. The method includes broadcasting, by a transducer on the first computing system, an ultrasound signal, where the ultrasound signal includes an identifier associated with the 3D map. The identifier is configured to be detected by a second computing system to join the AR environment.

19 Claims, 10 Drawing Sheets

(56) References Cited

U.S. PATENT DOCUMENTS

| | | | |
|---|---|---|---|
| 2017/0262154 A1 | 9/2017 | Black et al. | |
| 2018/0309808 A1* | 10/2018 | Andon | G06T 19/20 |
| 2018/0349703 A1* | 12/2018 | Rathod | A63F 13/65 |
| 2019/0280783 A1* | 9/2019 | Persson | H04W 4/022 |
| 2019/0310366 A1* | 10/2019 | Sipko | G01S 15/89 |
| 2019/0370700 A1* | 12/2019 | Ludwig | G06Q 10/00 |
| 2019/0373395 A1* | 12/2019 | Sarkar | H04S 7/304 |
| 2019/0377191 A1* | 12/2019 | Hughes | G02B 27/0176 |
| 2020/0302681 A1 | 9/2020 | Totty et al. | |
| 2021/0264672 A1* | 8/2021 | McIntyre, Jr. | G06T 19/006 |
| 2021/0385260 A1* | 12/2021 | Reddan | A63F 13/35 |

OTHER PUBLICATIONS

Ng, "Sharing Augmented Reality Experiences with Google Cloud Anchors in Unity3D", Medium, Jun. 27, 2018, 10 pages.

Novak, et al., "Ultrasound Proximity Networking on Smart Mobile Devices for IOT Applications", IEEE Internet of Things Journal, vol. 6, No. 1, Feb. 2019, p. 399-409.

U.S. Appl. No. 16/949,791, filed Nov. 13, 2020, Allowed.

\* cited by examiner

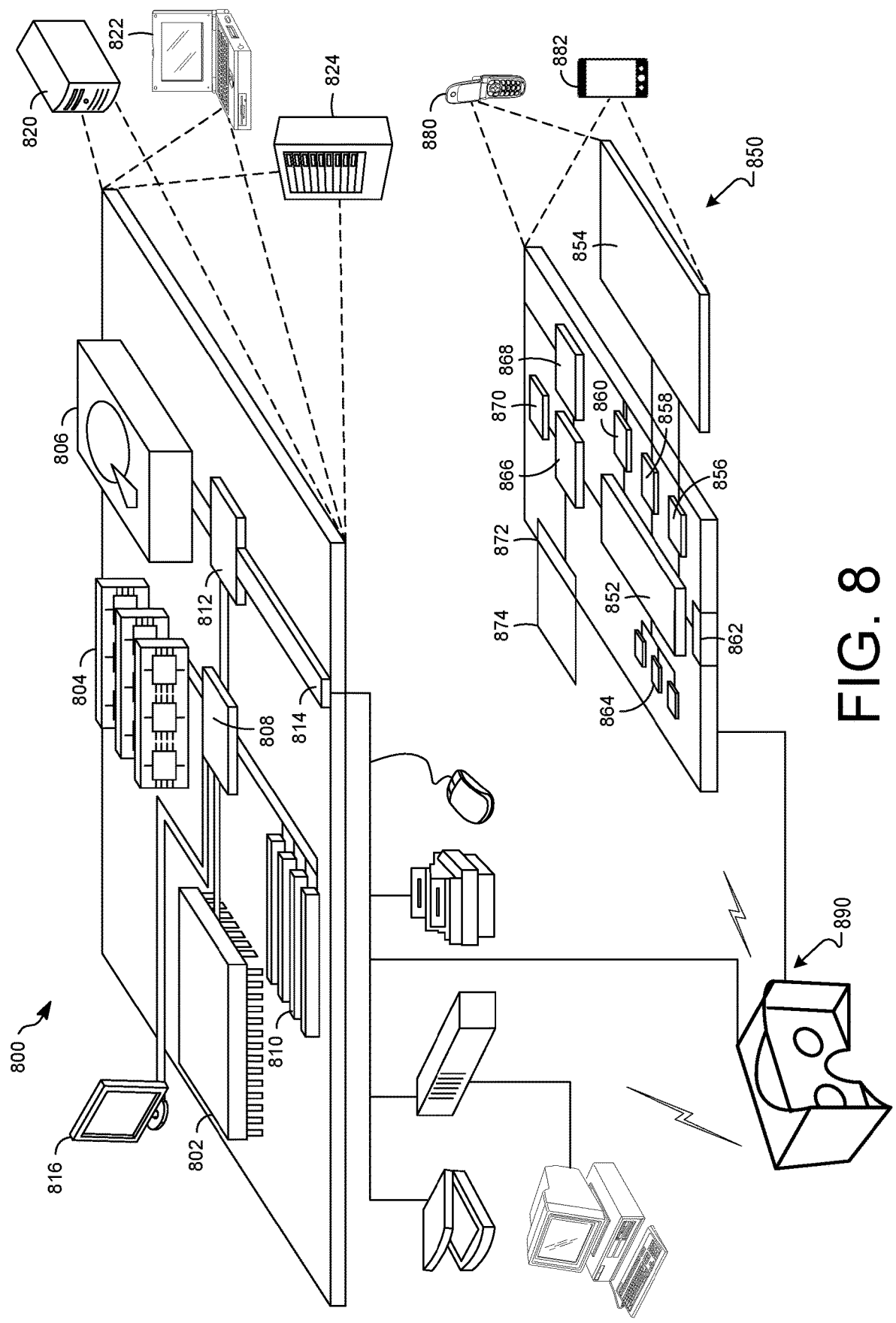

TRIGGERING A COLLABORATIVE AUGMENTED REALITY ENVIRONMENT USING AN ULTRASOUND SIGNAL

CROSS REFERENCE TO RELATED APPLICATION

This application is a continuation of U.S. application Ser. No. 16/949,791, filed Nov. 13, 2020, the disclosure of which is incorporated herein by reference in its entirety.

TECHNICAL FIELD

This description generally relates to sharing an augmented reality (AR) environment using an ultrasound signal, where the ultrasound signal includes an identifier for a three-dimensional map (3D) to be used by a user's computing device to join the AR environment.

BACKGROUND

In some collaborative augmented reality (AR) systems, a computing device may receive digital information about a host user's environment and create a virtual anchor based on the digital information, where the virtual anchor may represent a physical space such as a room (or a portion thereof) within a building. The host user may add a virtual object to the scene, and the virtual object is linked (or fixed to) a position in the virtual anchor. The virtual anchor may be shared with other users, which can join the space and view and interact with the virtual objects added by the host user. In some examples, in order to permit other users to join the host's environment, the host user may need to locate an identifier of the virtual anchor and provide the identifier to another user, where that user may need to manually enter the identifier to join the AR scene.

SUMMARY

According to an aspect, a method for sharing a collaborative augmented reality (AR) environment including obtaining, by a sensor system of a first computing system, visual data representing a physical space of an AR environment, where the visual data is used to create a three-dimensional (3D) map of the physical space. The 3D map includes a coordinate space having at least one virtual object added by a user of the first computing system. The method includes broadcasting, by a transducer on the first computing system, an ultrasound signal, where the ultrasound signal includes an identifier associated with the 3D map. The identifier is configured to be detected by a second computing system to join the AR environment.

According to some aspects, the method includes transmitting, by the first computing system, the visual data, over a network, to an AR collaborative service executable by a server computer, where the AR collaborative service is configured to create the 3D map based on the visual data, and receiving, by the first computing system, the identifier associated with the 3D map, over the network, from the AR collaborative service. The first computing system and the second computing system are connected to different networks. The identifier associated with the 3D map includes a room identifier. The method may include rendering, by the first computing system, a user interface (UI) object on a display in response to the identifier being detected on the second computing system, where the UI object includes a control for admitting a user associated with the second computing system in the AR environment. The first computing system includes a mobile computing device. The first computing system includes a wearable device. The wearable device includes smartglasses. The 3D map includes a feature point map configured to be compared against visual data captured by the second computing system.

According to an aspect, a method for joining a collaborative augmented reality (AR) environment includes detecting, by an ultrasound detector on a first computing system, an ultrasound signal, where the ultrasound signal includes an identifier associated with a 3D map of an AR environment, and the 3D map includes visual data mapped to a coordinate space having at least one virtual object added by a user associated with a second computing system, identifying, by the first computing system, the 3D map based on the identifier, and joining, by the first computing system, the AR environment using the 3D map such that a user of the first computing system and the user of the second computing system can interact with the at least one virtual object.

According to some aspects, the first computing system and the second computing system are connected to different networks. The identifier associated with the 3D map includes a room identifier. The first computing system includes a mobile computing device. The first computing system includes a wearable device. The wearable device includes smartglasses. The 3D map includes a feature point map configured to be compared against visual data captured by the second computing system.

According to an aspect, a non-transitory computer-readable medium storing executable instructions that when executed by at least one processor are configured to cause the at least one processor to receive, via a sensor system of a first computing system, visual data representing a physical space of an AR environment, where the visual data is used to create a three-dimensional (3D) map of the physical space, and the 3D map includes a coordinate space having at least one virtual object added by a user of the first computing system, and broadcast, by a transducer on the first computing system, an ultrasound signal, where the ultrasound signal includes an identifier associated with the 3D map. The identifier is configured to be detected by a second computing system and used to identify the 3D map and render the at least one virtual object on the second computing system such that the user of the first computing system and a user of the second computing system can simultaneously interact with the at least one virtual object.

According to some aspects, the executable instructions include instructions that cause the at least one processor to transmit, by the first computing system, the visual data, over a network, to an AR collaborative service executable by a server computer, where the AR collaborative service is configured to create the 3D map based on the visual data, and receive, by the first computing system, the identifier associated with the 3D map, over the network, from the AR collaborative service. In some examples, the AR collaborative service does not necessarily create a 3D map, but rather the AR collaborative service uses the visual data (e.g., transmitted by the first computing system) to localize the second computing system relative to the physical space and the first computing system. The first computing system and the second computing system are connected to different networks. The identifier associated with the 3D map includes a room identifier. The executable instructions include instructions that cause the at least one processor to render, by the first computing system, a user interface (UI) object on a display in response to the identifier being detected on the second computing system, where the UI object includes a control for admitting a user associated with the second computing system in the AR environment.

According to an aspect, a computing system for sharing a collaborative augmented reality (AR) environment includes a sensor system configured to obtain visual data representing a physical space of an AR environment, where the visual data is used to create a three-dimensional (3D) map of the physical space, and the 3D map includes a coordinate space having at least one virtual object added by a user of the computing system, and a transducer configured to broadcast an ultrasound signal, where the ultrasound signal includes an identifier associated with the 3D map. The identifier configured to be detected by another computing system and used to join the AR environment. In some examples, the computing system includes an antenna configured to transmit the visual data, over a network, to an AR collaborative service executable by a server computer, where the AR collaborative service is configured to create the 3D map based on the visual data, where the antenna is configured to receive the identifier associated with the 3D map, over the network, from the AR collaborative service.

BRIEF DESCRIPTION OF THE DRAWINGS

FIG. 8 illustrates example computing devices of the AR system according to an aspect.

DETAILED DESCRIPTION

The embodiments provide a first computing system that can share an identifier of a three-dimensional (3D) map of an AR environment using an ultrasonic signal, where the identifier is used by a second computing system to join the AR environment and/or connect to the first computing system such that a user of the first computing system and a user of the second computing system can view and interact with one or more virtual objects included in the shared AR environment.

Figure 1A:
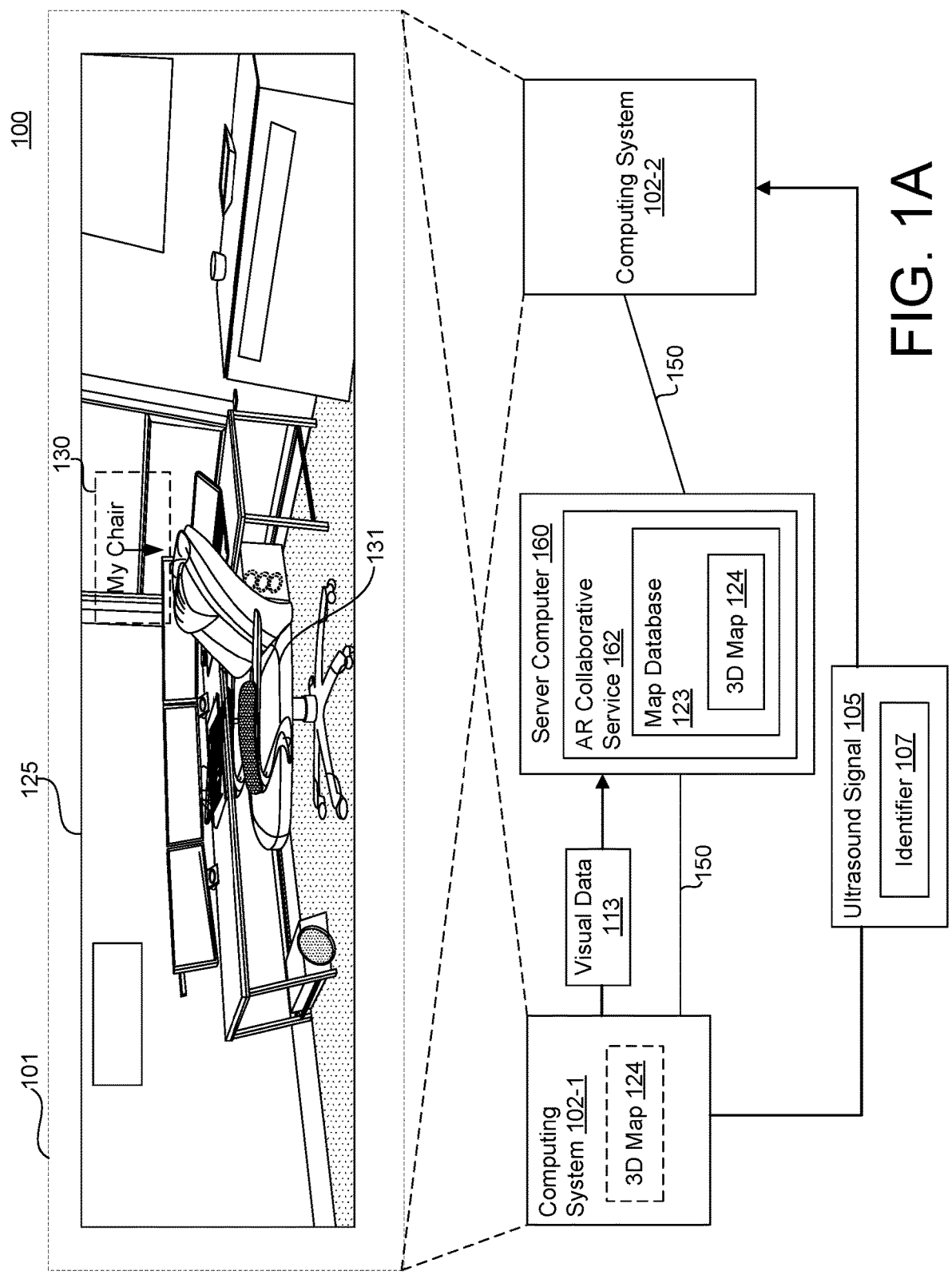
FIG. 1A illustrates an augmented reality (AR) system for sharing an AR environment between computing systems according to an aspect.
Figure 1B:
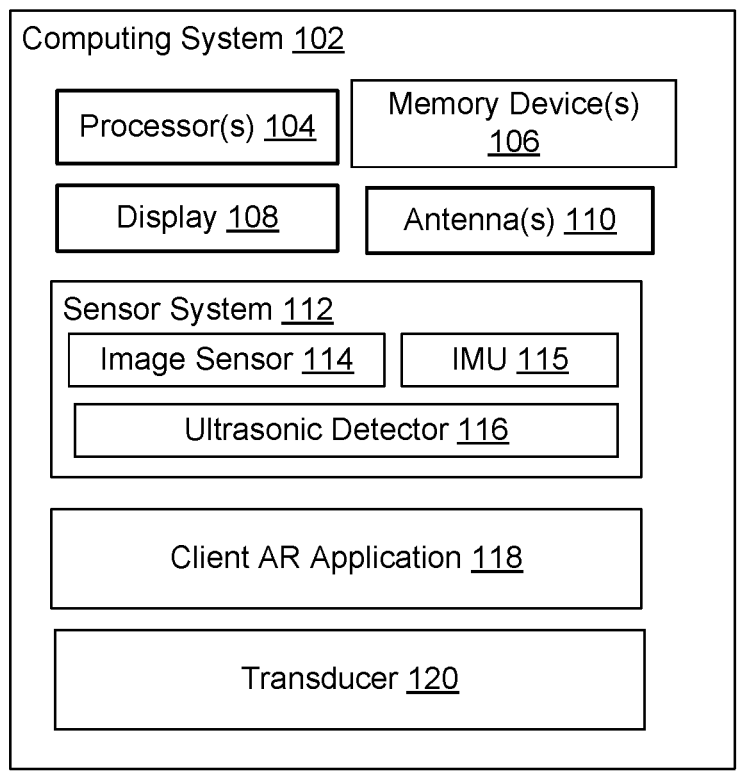
FIG. 1B illustrates an example of a computing system according to an aspect.
Figure 1C:
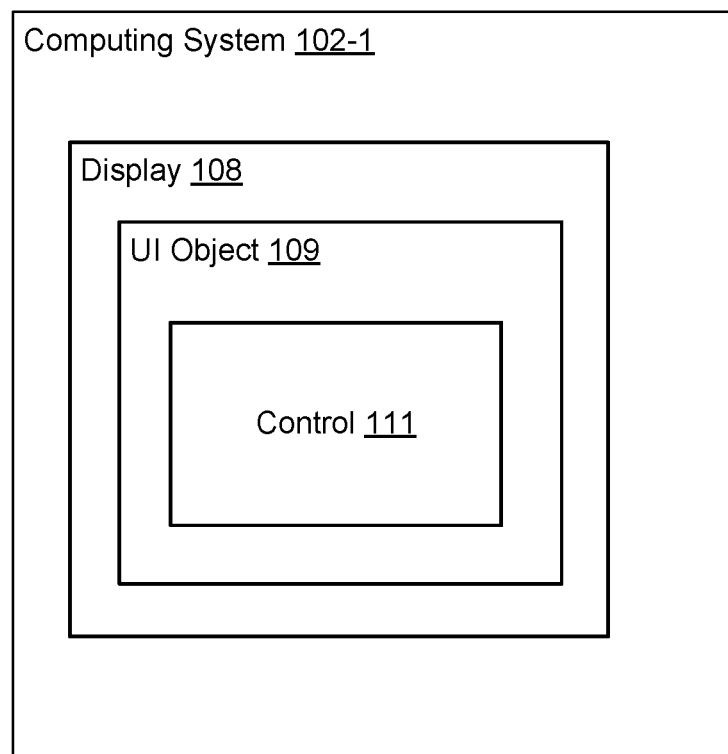
FIG. 1C illustrates an example of a display of the computing system according to an aspect.

FIGS. 1A through 1C illustrate an AR system 100 configured to store and share digital content in an AR environment 101 according to an aspect. Referring to FIG. 1A, the AR system 100 includes a first computing system 102-1 that can share an identifier 107 associated with a 3D map 124 of an AR environment 101 using an ultrasound signal 105, where the identifier 107 is used by a second computing system 102-2 to join the AR environment 101 and/or connect to the first computing system 102-1 such that a user of the first computing system 102-1 and a user of the second computing system 102-2 can view and interact with one or more virtual objects 130 included in the shared AR environment 101. Although FIGS. 1C through 1C illustrate two computing systems 100, the embodiments encompass any number of computing systems 100 (e.g., more than two) that can join the shared AR environment 101.

In some examples, the host user (e.g., associated with the first computing system 102-1) may not need to locate the identifier 107 and then send the identifier 107 to another user. Further, the user of the second computing system 102-1 does not need to manually enter the identifier 107 to join the AR environment 101. Rather, the identifier 107 is broadcasted by the first computing system 102-1 via the ultrasound signal 105, and in response to the detection of the identifier 107 by the second computing system 102-2, the second computing system 102-2 may automatically join the AR environment 101 and/or connect to the first computing system 102-1. In some examples, the first computing system 102-1 and the second computing system 102-2 are connected to different networks (e.g., different Internet networks). For example, the first computing system 102-1 may be connected to a Wi-Fi network, and the second computing system 102-2 may be connected to a mobile network. However, despite the first computing system 102-1 and the second computing system 102-2 being connected to different networks, the transmission of the ultrasound signal 105 may enable multiple users to be connected to the same AR environment 101.

Referring to FIG. 1B, a computing system 102 (which may be an example of the first computing system 102-1 and/or the second computing system 102-2) may be any type of mobile computing system such as a smartphone, a tablet, a laptop, wearable device, etc. In some examples, the computing system 102 includes one or more devices, where at least one of the devices is a display device capable of being worn on or in proximity to the skin of a person. In some examples, the computing system 102 is or includes a wearable device. The wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device includes smartglasses. Smartglasses is an optical head-mounted display device designed in the shape of a pair of eyeglasses. For example, smartglasses are glasses that add information (e.g., project a display 108) alongside what the wearer views through the glasses.

In some examples, the computing system 102 includes a wearable device (e.g., smartglasses) and a computing device (e.g., a mobile computing device such as a smartphone, tablet, laptop, or another wearable device such as a smart watch). The wearable device may be connected to the computing device via a wireless connection such as a short-range connection (e.g., Bluetooth connection or near-field communication (NFC) connection) or an Internet connection (e.g., Wi-Fi or mobile network). In some examples, some of the components of the computing system 102 are included in the wearable device and some of the components of the computing system 102 are included in the computing device. In some examples, all of the components of the computing system 102 are included in the wearable device.

The computing system 102 includes one or more processors 104, which may be formed in a substrate configured to execute one or more machine executable instructions or pieces of software, firmware, or a combination thereof. The processors 104 can be semiconductor-based—that is, the processors can include semiconductor material that can perform digital logic. The computing system 102 can also include one or more memory devices 106. The memory devices 106 may include any type of storage device that stores information in a format that can be read and/or executed by the processor(s) 104. The memory devices 106 may store applications and modules that, when executed by the processor(s) 104, perform certain operations. In some examples, the applications and modules may be stored in an external storage device and loaded into the memory devices 106. The computing system 102 includes one or more antennas 110 configured to communicate with other computing devices.

The computing system 102 includes a display 108. The display 108 may include a liquid crystal display (LCD), a light-emitting diode (LED) display, an organic light-emitting display (OLED), an electro-phoretic display (EPD), or a micro-projection display adopting an LED light source. In some examples, the display 108 is projected onto the field of view of the user. In some examples, the case of smartglasses, the display 108 may provide a transparent or semi-transparent display such that the user wearing the glasses can see images provided by the display 108 but also information located in the field of view of the smartglasses behind the projected images.

The computing system 102 includes a transducer 120 configured to generate and broadcast an ultrasound signal 105 that includes an identifier 107 associated with a 3D map 124. The transducer 120 may be a component or device included in the computing system 102 configured to convert electrical energy to one or more ultrasound signals 105. Further, the transducer 120 may be configured to encode the identifier 107 within the ultrasound signal 105 such that, in response to detection of the ultrasound signal 105, the second computing device 102-2 is configured to decode the ultrasound signal 105 to recover the identifier 107. The ultrasound signal 105 is a sound wave with frequencies higher than the upper audible limit of human hearing. As further explained below, the computing system 102 may generate the identifier 107 itself or receive the identifier 107 from the AR collaborative service 162. The transducer 120 may generate an ultrasound signal 105 that encodes the identifier 107.

The computing system 102 includes a sensor system 112. The sensor system 112 includes an image sensor 114 configured to obtain image data. In some examples, the sensor system 112 includes multiple image sensors 114. The image sensor 114 can take pictures and record video. The sensor system 112 may include an inertial motion unit (IMU) 154. The IMU 115 may detect motion, movement, and/or acceleration of the computing system 102. The IMU 115 may include various different types of sensors such as, for example, an accelerometer, a gyroscope, a magnetometer, and other such sensors. The sensor system 112 includes an ultrasonic detector 116 configured to detect and decode the ultrasound signal 105 to obtain an identifier 107 associated with a 3D map 124. The sensor system 112 may include other types of sensors such as a light sensor, an audio sensor, a distance and/or proximity sensor, a contact sensor such as a capacitive sensor, a timer, and/or other sensors and/or different combination(s) of sensors.

The computing system 102 includes a client AR application 118. In some examples, the client AR application 118 is a software development kit (SDK) that operates in conjunction with one or more AR applications. In some examples, in combination with the sensor system 112, the client AR application 118 is configured to detect and track a device's position relative to the physical space, detect the size and location of different types of surfaces (e.g., horizontal, vertical, angled), and estimate the environment's current lighting conditions. In some examples, the client AR application 118 (in conjunction with the sensor system 112) is configured to generate visual data 113, which is used to create a 3D map 124.

In some examples, the visual data 113 includes a 3D representation of a scene 125 of the AR environment 101. In some examples, the visual data 113 includes visual features with depth information. In some examples, the visual data 113 includes image data of one or more frames captured by the sensor system 112 of the computing system 102. In some examples, the visual data 113 includes a set of visual feature points with depth in space. In some examples, the set of visual feature points are a plurality of points (e.g., interesting points) that represent the user's environment. In some examples, each visual feature point includes an approximation of a fixed location and orientation in the physical space, and the set of visual feature points may be updated over time.

In some examples, the client AR application 118 is configured to generate the 3D map 124 and store the 3D map 124 locally on the computing system 102. In some examples, the 3D map 124 is generated at a server computer 160. In some examples, the client AR application 118 is configured to communicate with an AR collaborative service 162 via one or more application programming interfaces (APIs). For example, the client AR application 118 may transmit the visual data 113 over the network 150 to the AR collaborative service 162 via one or more APIs, and the AR collaborative service 162 generates and stores the 3D map 124.

The 3D map 124 includes a coordinate space in which visual information from the physical space and virtual objects 130 are positioned. In some examples, the visual information and virtual object 130 positions are updated in the 3D map 124 from image frame to image frame. In some examples, the 3D map 124 includes a sparse point map. In some examples, the 3D map 124 includes a feature point map having a set of visual feature points positioned in the coordinate space, where one or more virtual objects 130 can be attached to (or linked) to the visual feature points. In some examples, the set of visual feature points included in the 3D map 124 may be referred to as an anchor or a set of persistent visual features that represent physical objects in the physical world.

The 3D map 124 is used to share the AR environment 101 with one or more users (e.g., computing system 102-1, computing system 102-2) that join the AR environment 101 and is used to calculate where each user's computing system is located in relation to the physical space of the AR environment 101 such that multiple users can view and interact with the virtual objects 130. In some examples, the 3D map 124 is stored in a map database 123 at a server computer 160. In some examples, the 3D map 124 is stored locally at the hosting computing system, e.g., the first computing system 102-1. For example, the set of visual feature points of the 3D map 124 may be used to localize the AR environment 101 for another computing system, e.g., the second computing system 102-2. For example, the visual feature points in the 3D map 124 may be used to compare and match against other visual feature points captured by the second computing system 102-2 in order to determine whether the physical space is the same as the physical space of the stored visual feature points of the 3D map 124 and to calculate the location of the second computing system 102-2 within the AR environment 101 in relation to the visual feature points of the 3D map 124.

The AR environment 101 may involve a physical space which is within the view of a user and a virtual space within which one or more virtual objects 130 are positioned. As shown in FIG. 1A, the virtual objects 130 include a text description ("My Chair") along with an arrow that points to a physical object 131 (e.g., a chair), where the physical object 131 is located in the physical space. Providing (or rendering) the AR environment 101 may then involve altering the user's view of the physical space by displaying the virtual objects 130 such that they appear to the user to be present in, or overlayed onto or into, the physical space in the view of the user. The displaying of the virtual objects 130 is therefore according to a mapping (e.g. the 3D map 124) between the virtual space and the physical space. Overlaying the virtual objects 130 may be implemented, for example, by superimposing the virtual objects 130 into an optical field of view of a user of the physical space, by reproducing a view of the user of the physical space on one or more display screens, and/or in other ways, for example by using heads up displays, mobile device display screens and so forth.

The AR system 100 includes an AR collaborative service 162, executable by the server computer 160, configured to create a multi-user or collaborative AR experience that users can share. In some examples, the AR collaborative service 162 includes a map database 123 that stores a plurality of 3D maps 124, where each 3D map 124 is associated with a unique identifier 107. An identifier 107 includes data that can uniquely identify a particular 3D map 124. In some examples, the identifier 107 includes a room identifier that identifies a virtual space. In some examples, a particular 3D map 124 is associated with more than one identifier 107 such as an anchor identifier that uniquely identifies the 3D map 124 and a room identifier that identifies a particular virtual space. In some examples, the anchor identifier is stored internally, and the room identifier is broadcasted to other systems using the ultrasound signal 105. Each 3D map 124 may correspond to a separate physical space. In some examples, one 3D map 124 may include a physical space that at least partially overlaps with another 3D map 124. In some examples, a 3D map 124 may be stored locally on the first computing system 102-1 and/or the second computing system 102-2.

The AR collaborative service 162 communicates, over a network 150, with a plurality of computing devices including the first computing system 102-1 and the second computing system 102-1, where a user of the first computing system 102-1 and a user of the second computing system 102-2 may share the same AR environment 101. For example, the AR collaborative service 162 may allow users to create 3D maps 124 for creating multiplayer or collaborative AR experiences that users can share with other users. Users can add virtual objects 130 to an AR scene 125, and then multiple users can then view and interact with these virtual objects 130 simultaneously from different positions in a shared physical space.

The server computer 160 may be computing devices that take the form of a number of different devices, for example a standard server, a group of such servers, or a rack server system. In some examples, the server computer 160 is a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150.

A user may use the first computing system 102-1 to cause the generation of a 3D map 124. In some examples, the first computing system 102-1 may upload the visual data 113 to the AR collaborative service 162, and the AR collaborative service 162 generates the 3D map 124 based on the visual data 113. Using the information from the sensor system 112, the client AR application 118 is configured to generate the visual data 113, which may include a set of visual feature points to be sent and stored on the server computer 160 for future AR localization. In some examples, in response to the generation of the 3D map 124 at the AR collaborative service 162, the AR collaborative service 162 generates the identifier 107 and transmits the identifier 107 associated with the 3D map 124, over the network 150, to the first computing system 102-1. In some examples, the AR collaborative service 162 does not necessarily create a 3D map 124, but rather the AR collaborative service 162 uses the visual data 113 (e.g., transmitted by the first computing system 102-1) to localize the second computing system 102-2 relative to the physical space and the first computing system 102-1. In some examples, the identifier 107 is associated with the visual data 113 stored at the server computer 160 and is used to localize the second computing system 102-2. In some examples, the first computing system 102-1 generates the 3D map 124 (and the identifier 107) and stores the 3D map 124 locally on the first computing system 102-1.

Then, the computing system 102-1 (e.g., the transducer 120) may broadcast an ultrasound signal 105 that includes the identifier 107. The second computing system 102-2 (e.g., the ultrasonic detector 116) may detect the identifier 107 from the ultrasound signal 105, which can cause the second computing system 102-2 to join the AR environment 101 and/or connect to the first computing system 102-1. In some examples, upon detection of the identifier 107, the second computing system 102-2 uses the identifier 107 to join the AR environment 101. For example, the second computing system 102-2 may transmit the identifier 107 to the AR collaborative service 162 to identify the appropriate 3D map 124, which causes the AR collaborative service 162 to resolve the 3D map 124 against visual data 113 (e.g., feature points) captured by the second computing system 102-2. In some examples, when another user in the same environment points their device camera at the area where the 3D map 124 was hosted, a resolve request (e.g., generated by the second computing system 102-2) causes the AR collaborative service 162 to periodically compare visual features from the scene 125 against the 3D map 124, which the second computing system 102-2 uses to pinpoint the user's position and orientation relative to the 3D map 124.

In some examples, upon detection of the identifier 107 from the ultrasound signal 105, the second computing system 102-2 is configured to connect to the first computing system 102-1 and receive the 3D map 124 from the first computing system 102-1. The second computing system 102-2 uses the 3D map 124 to compare visual features from the scene 125 against the 3D map 124, which the second computing system 102-2 uses to pinpoint the user's position and orientation relative to the 3D map 124.

In some examples, as shown in FIG. 1C, upon detection of the identifier 107 from the ultrasound signal 105 by the second computing system 102-2, the first computing system 102-1 is configured to render a UI object 109 on the display 108 of the first computing system 102-1, where the UI object 109 includes a control 111 that permits the user of the first computing system 102-1 to allow (or deny) the user of the second computing system 102-2 to join the AR environment 101.

Figure 2:
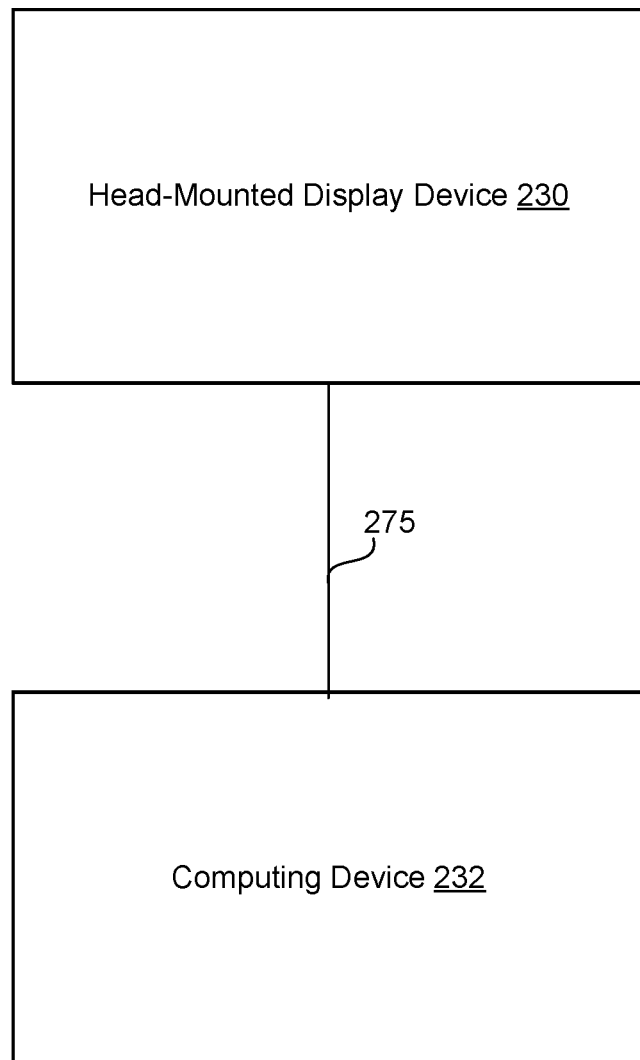
FIG. 2 illustrates an example of a computing system according to an aspect.

FIG. 2 illustrates a computing system 202 according to another aspect. The computing system 202 may include any of the features described with reference to the computing system 102 of FIGS. 1A through 1C (e.g., the first computing system 102-1 and/or the second computing system 102-2). In some examples, the computing system 202 includes a head-mounted display device 230. In some examples, the head-mounted display device 230 includes all of the components of the computing system 102 of FIGS. 1A through 1C. For example, the head-mounted display device 230 may include the processor(s) 104, the memory device(s) 106, the sensor system 112 (including the image sensor 114, the IMU 115, the ultrasonic detector 116), the antenna(s) 110, the client AR application 118, and the transducer 120 of FIG. 1B.

In some examples, the head-mounted display device 230 includes the map database 123 and/or the 3D map(s) 124 of FIGS. 1A through 1C. In some examples, the head-mounted display device 230 is configured to generate and store the 3D maps 124 as explained with reference to FIGS. 1F through 1C, where the 3D maps 124 can be stored locally on the head-mounted display device 230 or on a server computer (e.g., server computer 160 of FIGS. 1A through 1C).

In some examples, the computing system 202 includes the head-mounted display device 230 and a computing device 232. The computing device 232 may be connected to the head-mounted display device 230 via a wireless connection 275. In some examples, the computing device 232 includes a mobile computing device such as a smartphone, tablet, laptop, or other wearable device. In some examples, the wireless connection 275 is a short-range communication link such as near-field communication (NFC) connection or Bluetooth connection. In some examples, the wireless connection 275 is a network connection such as a local area network (LAN), a wide area network (WAN), a cellular network, satellite network, or other types of data networks. In some examples, the wireless connection 275 may include any number of computing devices (e.g., computer, servers, routers, network switches, etc.) that are configured to receive and/or transmit data within a network.

In some examples, some of the components of the computing system 102 of FIGS. 1A through 1C are included in the head-mounted display device 230, and some of the components of the computing system 102 of FIGS. 1A through 1C are included in the computing device 232. In some examples, the sensor system 112, the processor(s) 104, the memory device(s) 106, the antenna(s) 110, and the display 108 of FIG. 1B are included in the head-mounted display device 230. In some examples, the client AR application 118 of FIG. 1B is included in the computing device 232. In some examples, the transducer 120 of FIG. 1B is included in the computing device 232. In some examples, the ultrasonic detector 116 is included in the computing device 232. In some examples, the map database 123 and/or the 3D map 124 is included on the computing device 232.

Figure 3:
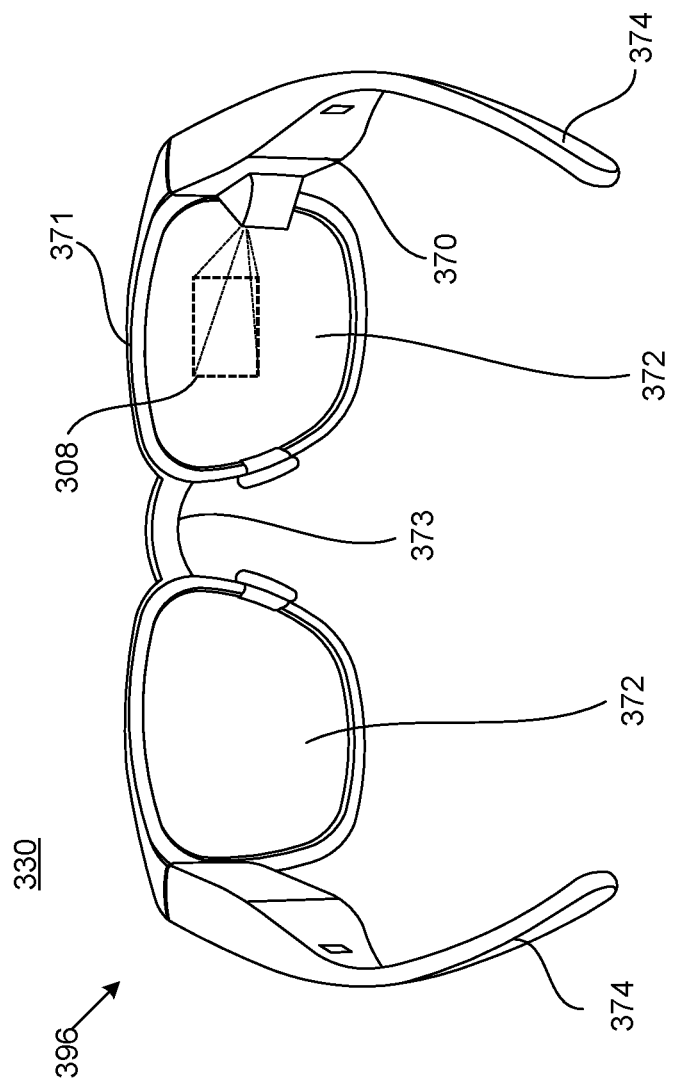
FIG. 3 illustrates an example of a computing system according to another aspect.

FIG. 3 illustrates an example of a head-mounted display device 330 according to an aspect. The head-mounted display device 330 may be an example of the computing system 102 of FIGS. 1A through 1C and/or the head-mounted display device 230 of FIG. 2. The head-mounted display device 330 includes smartglasses 396. Smartglasses 396 are glasses that add information (e.g., project a display 308) alongside what the wearer views through the glasses. In some examples, instead of projecting information, the display 308 is an in-lens micro display. In some examples, smartglasses 396 (e.g., eyeglasses or spectacles), are vision aids, including lenses 372 (e.g., glass or hard plastic lenses) mounted in a frame 371 that holds them in front of a person's eyes, typically utilizing a bridge 373 over the nose, and legs 374 (e.g., temples or temple pieces) which rest over the ears. The smartglasses 396 include an electronics component 370 that includes circuitry of the smartglasses 396. In some examples, the electronics component 370 includes a housing that encloses the components of the computing system 102 of FIGS. 1A through 1C and/or the components of the head-mounted display device 230 of FIG. 2. In some examples, the electronics component 370 is included or integrated into one of the legs 374 (or both of the legs 374) of the smartglasses 396.

Figure 4:
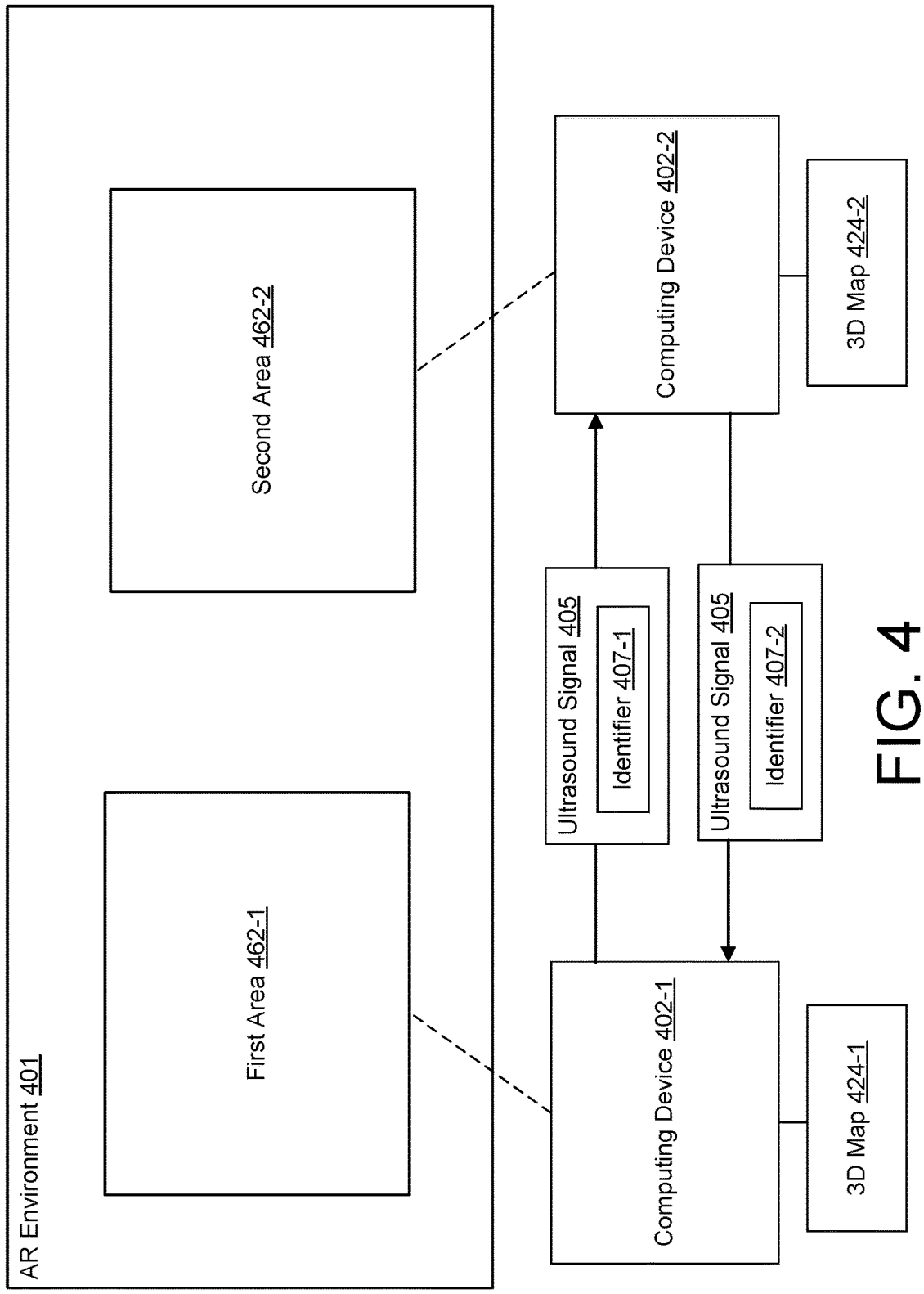
FIG. 4 illustrates an AR system for sharing an AR environment between computing systems according to another aspect.

FIG. 4 illustrates an AR system 400 configured to store and share digital content in an AR environment 101 according to an aspect. The AR system 400 may be an example of the AR system 100 of FIGS. 1A through 1C and may include any of the details discussed with reference to those figures (and/or or any of the details discussed with reference to FIGS. 2 and 3).

The AR system 100 may include a first computing device 402-1 and a second computing device 402-2. In some examples, the first computing device 402-1 may cause the generation of a first 3D map 424-1 (which can be stored locally on the first computing device 402-1 or stored remotely on a server computer). The first 3D map 424-1 may be associated with a first area 462-1 (e.g., a physical space or a subset of a physical space). In some examples, the second computing device 402-2 may cause the generation of a second 3D map 424-2 (which can be stored locally on the second computing device 402-2 or stored remotely on a server computer). The second 3D map 424-2 may be associated with a second area 462-2 (e.g., a physical space or a subset of a physical space).

In some examples, the user of the first computing device 402-1 may point his/her camera at the first area 462-1 to capture the visual features points of the first area 462-1, where the first 3D map 424-1 is generated based on the visual feature points from the first area 462-1. Around the same time or at a different time, the user of the second computing device 402-2 may point his/her camera at the second area 462-2 to capture the visual features points of the second area 462-2, where the second 3D map 424-2 is generated based on the visual feature points from the second area 462-2. In some examples, the second area 462-2 at least partially overlaps with the first area 462-1. In some examples, the second area 462-1 is separate and distinct from the first area 462-1 (e.g., the second area 462-1, the first area 462-1 do not overlap).

In some examples, the first computing device 402-1 may transmit an ultrasound signal 405 that includes an identifier 407-1 associated with the first 3D map 424-1. Upon detection of the ultrasound signal 405 by the second computing device 402-2, the second computing device 402-2 may use the identifier 407-1 to join an AR environment 101 corresponding to the first area 462-1 when the second computing device 402-2 enters the physical space associated with the first area 462-1. In some examples, the second computing device 402-2 may transmit an ultrasound signal 405 that includes an identifier 407-2 associated with the second 3D map 424-2. Upon detection of the ultrasound signal 405 by the first computing device 402-1, the first computing device 402-1 may use the identifier 407-2 to join an AR environment 101 corresponding to the second area 462-2 when the first computing device 402-1 enters the physical space associated with the second area 462-2. In some examples, if the first 3D map 424-1 and the second 3D map 424-2 sufficiently overlap, the first 3D map 424-1 and the second 3D map 424-2 may be combined into a single 3D map (along with a single identifier that identifies the larger map).

Figure 5:
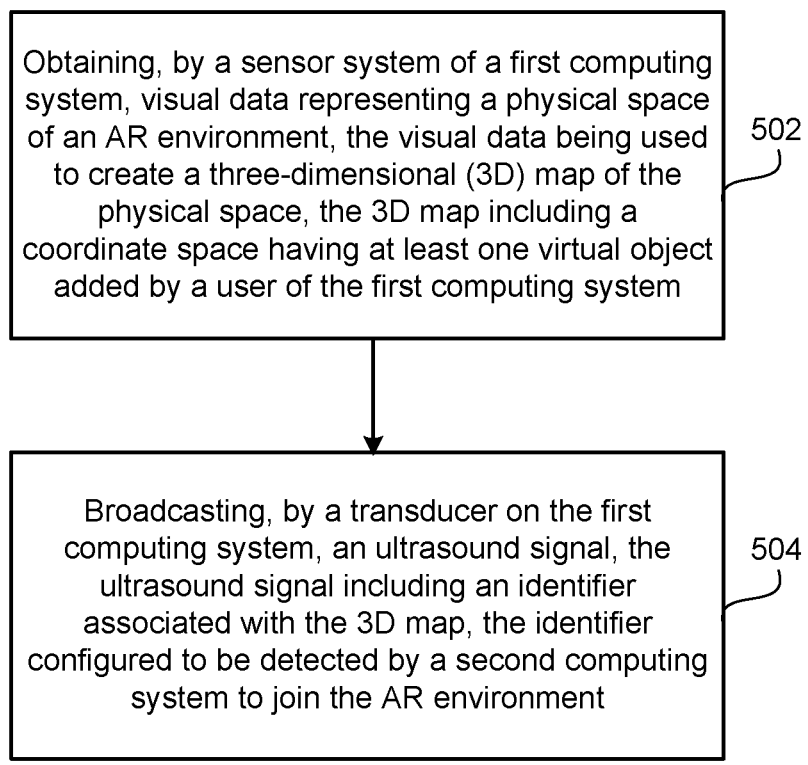
FIG. 5 illustrates a flowchart depicting example operations of an AR system for sharing an AR environment between computing systems according to an aspect.

FIG. 5 illustrates a flow chart 500 depicting example operations of an AR system according to an aspect. Although the operations are described with reference to the AR system 100, the operation of FIG. 5 may be applicable to any of the systems described herein. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

Operation 502 includes obtaining, by a sensor system 112 of a first computing system 102-1, visual data 113 representing a physical space of an AR environment 101, where the visual data 113 is used to create a three-dimensional (3D) map 124 of the physical space and the 3D map 124 includes a coordinate space having at least one virtual object 130 added by a user of the first computing system 102-1.

Operation 504 includes broadcasting, by a transducer 120 on the first computing system 102-1, an ultrasound signal 105, where the ultrasound signal 105 includes an identifier 107 associated with the 3D map 124, and the identifier 107 is configured to be detected by a second computing system 102-2 to join the AR environment 101.

Figure 6:
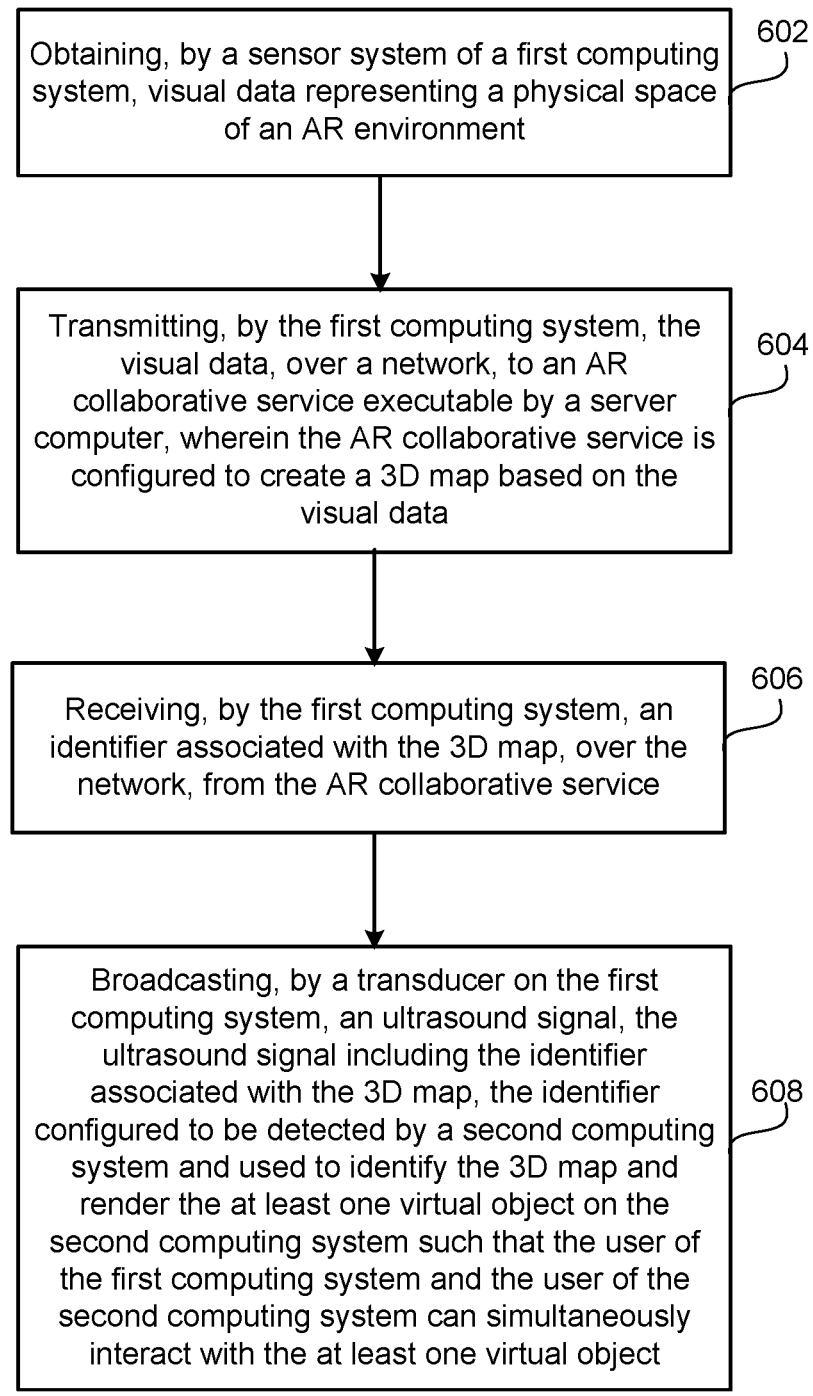
FIG. 6 illustrates a flowchart depicting example operations of an AR system for sharing an AR environment between computing systems according to another aspect.

FIG. 6 illustrates a flow chart 600 depicting example operations of an AR system according to an aspect. Although the operations are described with reference to the AR system 100, the operation of FIG. 6 may be applicable to any of the systems described herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

Operation 602 includes obtaining, by a sensor system 112 of a first computing system 102-1, visual data 113 representing a physical space of an AR environment 101. Operation 604 includes transmitting, by the first computing system 102-1, the visual data 113, over a network 150, to an AR collaborative service 162 executable by a server computer 160, where the AR collaborative service 162 is configured to create a 3D map 124 based on the visual data 113.

Operation 606 includes receiving, by the first computing system 102-1, an identifier 107 associated with the 3D map 124, over the network 150, from the AR collaborative service 162. Operation 608 includes broadcasting, by a transducer 120 on the first computing system 102-1, an ultrasound signal 105, where the ultrasound signal 105 includes the identifier 107 associated with the 3D map 124, where the identifier 107 is configured to be detected by a second computing system 102-2 and used to identify the 3D map 124 and render the at least one virtual object 130 on the second computing system 102-2 such that the user of the first computing system 102-1 and the user of the second computing system 102-2 can simultaneously interact with the at least one virtual object 130.

Figure 7:
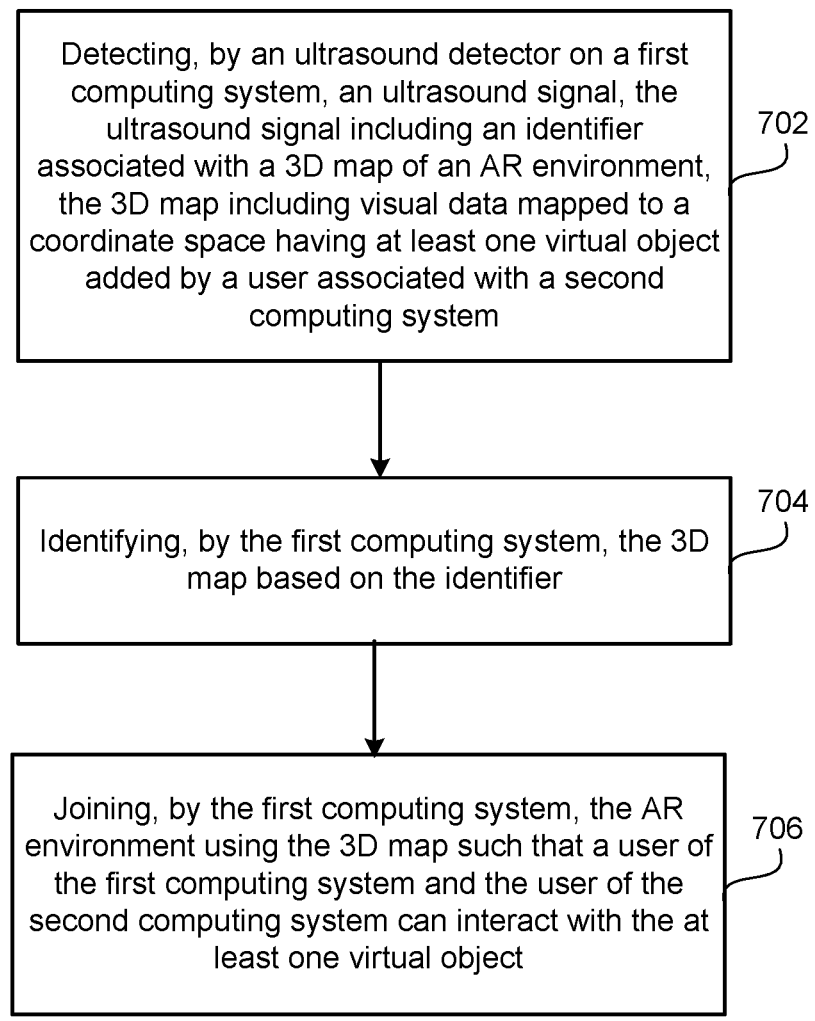
FIG. 7 illustrates a flowchart depicting example operations of an AR system for sharing an AR environment between computing systems according to another aspect.

FIG. 7 illustrates a flow chart 700 depicting example operations of an AR system according to an aspect. Although the operations are described with reference to the AR system 100, the operation of FIG. 7 may be applicable to any of the systems described herein. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes detecting, by an ultrasonic detector 116 on a first computing system 102-1, an ultrasound signal 105, where the ultrasound signal 105 includes an identifier 107 associated with a 3D map 124 of an AR environment 101, and the 3D map 124 includes visual data 113 mapped to a coordinate space having at least one virtual object 130 added by a user associated with a second computing system 102-2.

Operation 704 includes identifying, by the first computing system 102-1, the 3D map 124 based on the identifier 107. Operation 706 includes joining, by the first computing system 102-1, the AR environment 101 using the 3D map 124 such that a user of the first computing system 102-1 and the user of the second computing system 102-2 can interact with the at least one virtual object 130.

FIG. 8 shows an example of an example computer device 800 and an example mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provided as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   obtaining first visual data captured from a sensor system of a first user device, the first visual data representing a first physical space of an extended reality environment;
   generating, using the first visual data, a first three-dimensional (3D) map of the first physical space, the first 3D map including a coordinate space having a virtual object added by a user of the first user device;
   obtaining second visual data captured from a sensor system of a second user device;
   generating, using the second visual data, a second 3D map of a second physical space of the extended reality environment; and
   in response to the second 3D map at least partially overlapping with the first 3D map, generating a third 3D map by merging the second 3D map with the first 3D map.

2. The method of claim 1, wherein the first visual data includes a set of feature points with depth, the set of feature points including a feature point having a location and an orientation in the first physical space.

3. The method of claim 1, the method comprising:
   executing a comparison of the first 3D map with the second visual data such that the virtual object is configured to be rendered on a user interface of the second user device in response to a successful comparison.

4. The method of claim 1, further comprising:
   transmitting an identifier associated with the first 3D map to the second user device, the identifier configured to be used to join the extended reality environment.

5. The method of claim 1, wherein the virtual object is a first virtual object, the method further comprising:
   receiving an indication of a second virtual object being added by a user of the second user device; and
   in response to the indication, updating the third 3D map with the second virtual object.

6. The method of claim 1, further comprising:
   assigning an identifier to the 3D map; and
   transmitting the identifier to at least one of the first user device or the second user device.

7. The method of claim 1, wherein the first user device includes a smartphone.

8. The method of claim 1, wherein the first user device includes a head-mounted display device.

9. A non-transitory computer-readable medium storing executable instructions that cause at least one processor to execute operations, the operations comprising:
   obtaining first visual data captured from a sensor system of a first user device, the first visual data representing a first physical space of an extended reality environment;
   generating, using the first visual data, a first three-dimensional (3D) map of the first physical space, the first 3D map including a coordinate space having a virtual object added by a user of the first user device;
   obtaining second visual data captured from a sensor system of a second user device;
   generating, using the second visual data, a second 3D map of a second physical space of the extended reality environment, the second physical space at least partially overlapping with the first physical space; and
   in response to the second 3D map at least partially overlapping with the first 3D map, generating a third 3D map by merging the second 3D map with the first 3D map.

10. The non-transitory computer-readable medium of claim 9, wherein the first visual data includes a first set of feature points with depth, the first set of feature points being mapped in the coordinate space of the first 3D map, wherein the second visual data includes a second set of feature points with depth, the second set of feature points being mapped in a coordinate space of the second 3D map.

11. The non-transitory computer-readable medium of claim 9, the operations further comprising:
    executing a comparison of the first 3D map with the second visual data such that the virtual object is configured to be rendered on a user interface of the second user device in response to a successful comparison.

12. The non-transitory computer-readable medium of claim 9, wherein the operations further comprise:
    transmitting an identifier associated with the first 3D map to the second user device, the identifier configured to be used to join the extended reality environment.

13. The non-transitory computer-readable medium of claim 9, wherein the virtual object is a first virtual object, the operations further comprising:
    receiving an indication of a second virtual object being added by a user of the second user device; and
    in response to the indication, updating a coordinate space of the third 3D map with the second virtual object.

14. The non-transitory computer-readable medium of claim 9, wherein the operations further comprise:
    assigning an identifier to the third 3D map; and
    transmitting the identifier to at least one of the first user device or the second user device.

15. A computing system comprising:
    at least one processor; and
    a non-transitory computer-readable medium storing executable instructions that cause the at least one processor to:
    obtain first visual data captured from a sensor system of a first user device, the first visual data representing a first physical space of an extended reality environment;
    generate, using the first visual data, a first three-dimensional (3D) map of the first physical space, the first 3D map including a coordinate space having a virtual object added by a user of the first user device;
    obtain second visual data captured from a sensor system of a second user device;
    generate, using the second visual data, a second 3D map of a second physical space of the extended reality environment; and in response to the second 3D map at least partially overlapping with the first 3D map, generate a third 3D map by merging the second 3D map with the first 3D map.

16. The computing system of claim 15, wherein the first visual data includes a set of feature points with depth, the set of feature points including a feature point having a location and an orientation in the first physical space.

17. The computing system of claim 15, wherein the executable instructions include instructions that cause the at least one processor to:
execute a comparison of the first 3D map with the second visual data such that the virtual object is configured to be rendered on a user interface of the second user device in response to a successful comparison.

18. The computing system of claim 15, wherein the executable instructions include instructions that cause the at least one processor to:
transmit an identifier associated with the first 3D map to the second user device, the identifier configured to be used to join the extended reality environment.

19. The computing system of claim 15, wherein the virtual object is a first virtual object, wherein the executable instructions include instructions that cause the at least one processor to:
receive an indication of a second virtual object being added by a user of the second user device; and
in response to the indication, update the third 3D map with the second virtual object.

* * * * *